May 8, 1956

C. A. SCHOFIELD 2,744,850

METHOD OF MAKING FORMED ARTICLE COMPRISING
A RESINOUS SHEET BACKED BY PLYWOOD

Filed July 17, 1952

*INVENTOR.*
C.A. SCHOFIELD
BY Harry Langsam

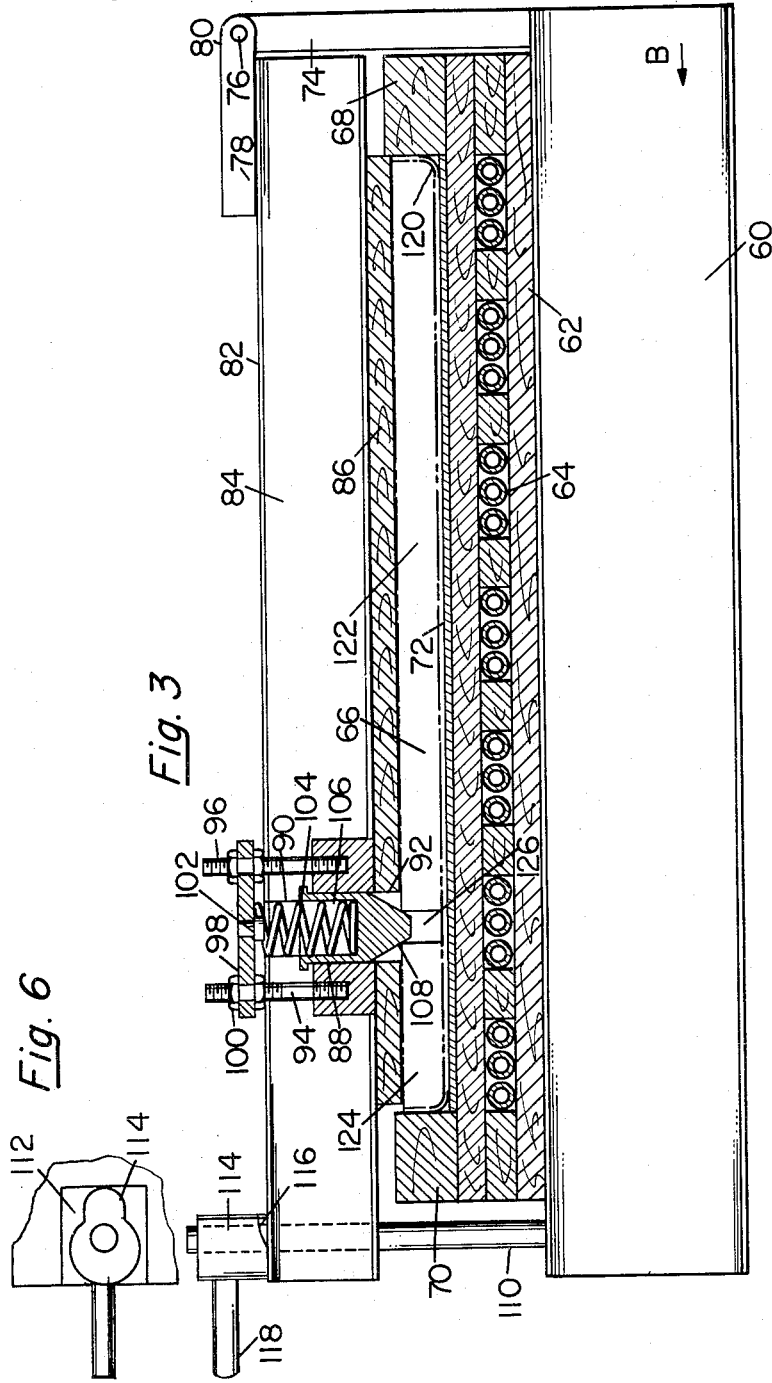

May 8, 1956  C. A. SCHOFIELD  2,744,850
METHOD OF MAKING FORMED ARTICLE COMPRISING
A RESINOUS SHEET BACKED BY PLYWOOD
Filed July 17, 1952  3 Sheets-Sheet 3
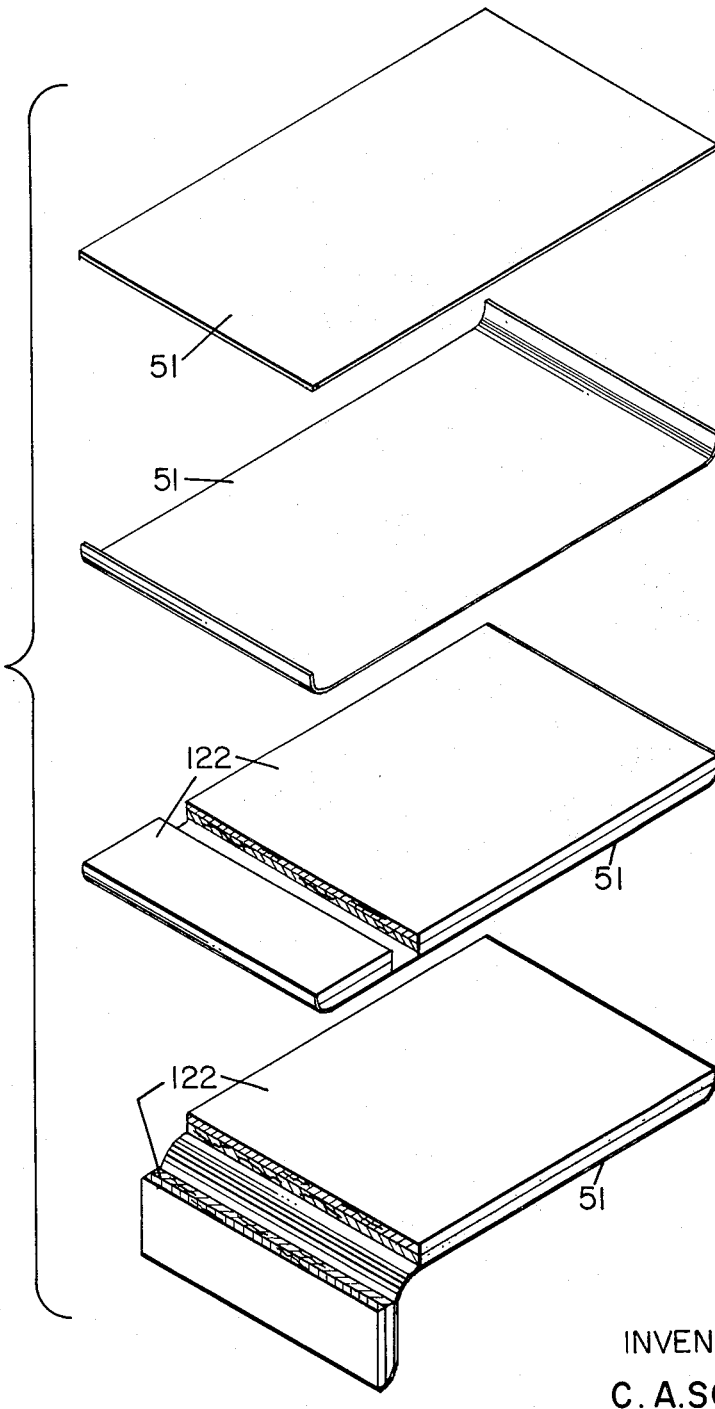
INVENTOR
C. A. SCHOFIELD
BY
Harry Langram
ATTORNEY United States Patent Office 2,744,850
Patented May 8, 1956

2,744,850

METHOD OF MAKING A FORMED ARTICLE COMPRISING A RESINOUS SHEET BACKED BY PLYWOOD

Christian A. Schofield, Philadelphia, Pa.

Application July 17, 1952, Serial No. 299,409

1 Claim. (Cl. 154—110)

This invention relates to a method and means of forming fully cured resinous sheet material into articles having any desired curves or contours and particularly relates to the treatment of material such as go by the name "Formica." It additionally relates to the forming of such resinous sheet material when it is provided with a relatively rigid backing material such as wood.

The use of "Formica" (laminated phenol-formaldehyde resins with mica or other fillers) in table-tops, sinks, shelves, desk-tops and a wide variety of other articles in the home and office has made it expedient to discover a cheap and easy process for forming this material into all the variety of shapes and sizes which the market demands. It is, therefore, an object of my invention to provide a process for shaping such materials as "Formica" into any desired shape or contour.

It is a further object of my invention to shape such materials as "Formica" without reducing the strength of the material.

Another object of my invention is to use steam or other heated fluid guided through pipes for the purpose of softening the resinous material.

A still further object of my invention is to provide a means for shaping the material which shall be simple and easy to use.

Other objects of my invention are to provide an improved method and device of the characters described that are easily and economically used and produced and which are highly effective in operation.

With the above and related objects in view, my invention consists in the details of construction and combination of parts, as will be more fully understood from the following description, when read in conjunction with the accompanying drawings in which:

Fig. 3 is a sectional view of the apparatus for bonding the sheet to the wooden backing.

Fig. 5 shows the transformation of the article from a resinous sheet to a curved article comprising a resinous sheet having a backing thereon.

Fig. 6 is a top plan view of the cam locking device.

Figure 1:
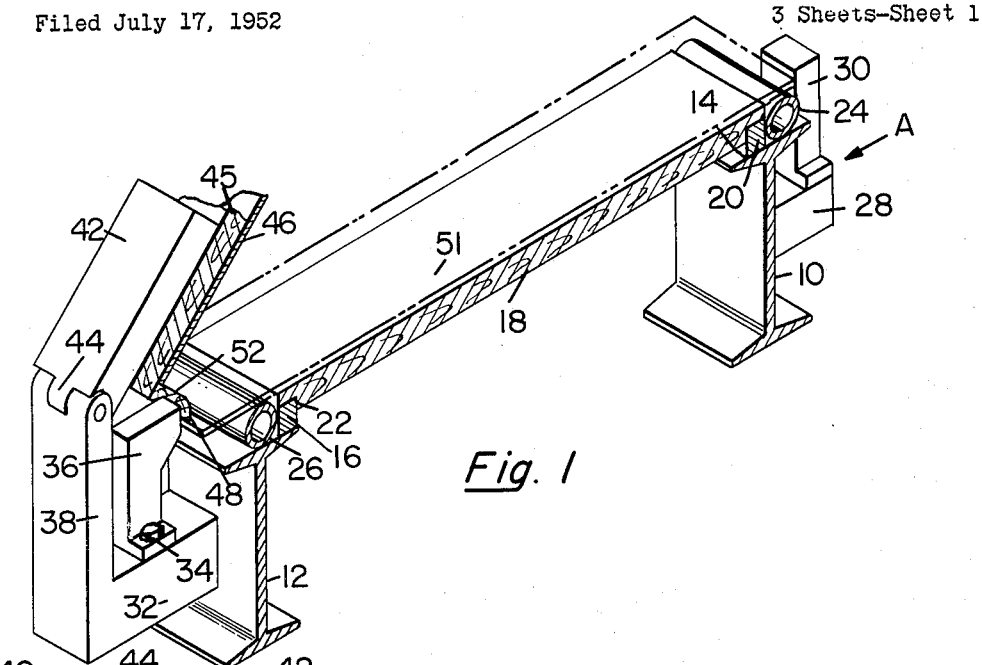
Fig. 1 is a sectional view of the lower portion of the sheet forming device and showing part of the hinged upper portion.

Referring in detail to the drawings, A designates the sheet forming device which comprises a pair of legs 10 and 12 in the shape of I beams. Mounted on top of leg 10 is a block 14 and mounted on top of leg 12 is a block 16. A base member 18 is mounted upon the blocks 14 and 16 by means of recesses 20 and 22 into which the blocks fit. Mounted on top of the leg 10 and adjacent to block 14 is a heating pipe 24 and mounted on top of leg 12 and adjacent to block 16 is a heating pipe 26. Connected to the leg 10 is a bracket member 28 and upstanding from member 28 is guide member 30. Connected to the leg 12 is a bracket member 32 and connected to member 32 as by bolt 34 is a guide member 36. Also mounted on bracket 32 and outwardly of member 36 is upstanding member 38 which is provided at its top with a hinge pin 40. A link 42 having a bifurcated end 44 is adapted to be pivotally connected to member 38 by means of hinge pin 40. Connected to the link 42 is a top member 45 having a working surface 46 and being provided with depending bifurcated members 48 and 50.

Figure 2:
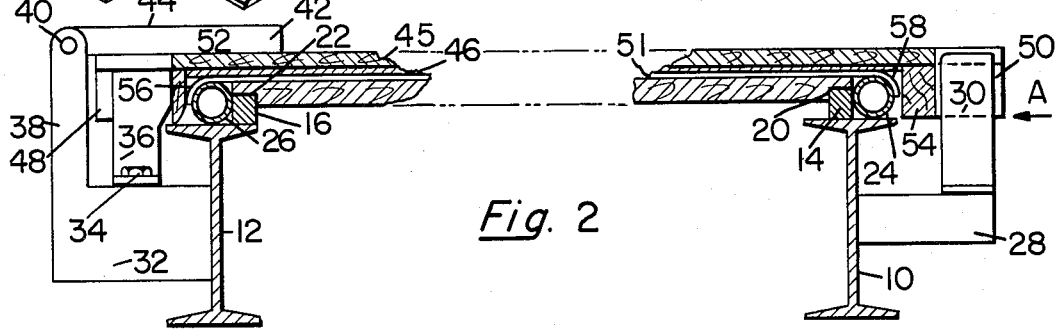
Fig. 2 is a fragmentary sectional view showing the upper hinged portion in working position.
Figure 4:
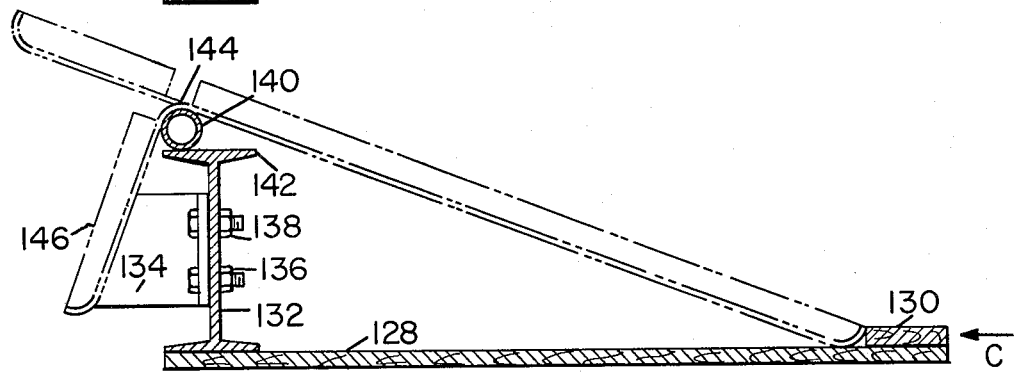
Fig. 4 is a sectional view of the device for shaping the wooden backed sheet into final form.

When a sheet of resinous material 51 such as "Formica" is placed on base member 18 so that its edges overlie the heating pipes 24 and 26, the heat from the pipes will begin to melt that part of the workpiece which is in contact with it. When, thereafter, the top member 44 is swung down onto the workpiece the edges 52 and 54 of the members 48 and 50 act to bend the partly melted and softened edges of the sheet over the heating pipes as illustrated at 56 and 58 in Fig. 2. The bifurcated portions of the members 48 and 50 slide over the guide members 36 and 30 as the top member 44 swings down. After a certain length of time for heating, such time depending on several factors such as the temperature, pressure and humidity of the environment, the top member is swung upwards and the work now in the form of a shell is removed and allowed to cool.

In Fig. 3 is shown apparatus B for bonding the preformed resinous shell produced by the above method to a backing surface, such backing surface being usually of plywood, beaverboard or similar materials. The apparatus B consists of a base member 60 upon which is provided a heating unit 62 in which are embedded heating pipes 64. A recess 66 is formed on the upper surface of heating unit 62 by providing a boundary block 68 at one end and a boundary block 70 at the other end. A work engaging surface 72 is provided at the bottom of the recess 66, such surface 72 abutting block 70 but being spaced from block 68 so as to provide a further recess 73 to conform to the shell shape of the workpiece.

A bracket member 74 is mounted on base member 60 outwardly of the heating unit 62 and extending well over the top of the heating unit. A hinge pin 76 is provided at the top of member 74 and a link member 78 having a bifurcated end 80 is hingedly connected to member 74 by means of hinge pin 76. Connected to link 78 is a top member 82. The member 82 comprises a block 84 which is provided on its under surface with a work engaging surface 86, the surface 86 being of less length than the block 84 so that it freely fits into the recess 66. At least one opening 88 is provided in the bottom of the block 84 and this opening 88 mates with a smaller opening 90 in the top of the block and with an opening 92 in the work engaging surface 86. Two bolts 94 and 96 are provided in the block 84, one on each side of the opening 88 and these bolts extend over the top of the block. Connected to bolts 94 and 96 and overlying the top of the block is a cross-piece 98. The cross-piece 98 is held in place on the bolts by upper and lower nuts 100. A bearing member 102 is provided in the middle of the cross piece overlying the opening 90. In the opening 90 is provided a spring member 104 which extends into a recess 106 of a wedge shaped member 108 which is provided in the opening 88. The pressure of the spring 104 on the wedge member 108 is adjustably regulated by loosening the nuts 100 and moving the cross-piece 98 up and down on the bolts according to the spring compression desired.

At least one post 110 is mounted on base member 60 outwardly of the heating unit 62 and opposite to the bracket member 74. This post extends through a slot 112 in the edge of block 84. An eccentric cam member 114 having a cam surface 116 is mounted on top of post 110 and connected to the cam member 114 is an operating handle 118. The cam member 114, when in unlocked position, lies entirely within the slot 112. By swinging handle 118, the cam member is rotated so that its eccentric portion overlies the top surface of the block 84 and as the handle is swung farther, the cam surface 116 on the bottom of the cam member acts to press the top member 82 against the workpiece.

The workpiece, in this case, is the previously formed shell A and this shell is placed in the recess 66, while the hinged top member is swung upwards, with the end 120 of the shell fitting into the recess 73. Two separate backing members 122 and 124 made of plywood, beaverboard or similar material are placed above the shell with a glue or other bonding material provided between the shell 51 and the backing members. The top member is then swung down into the position shown in full line in Fig. 3 and the cam lock is rotated to press the top member against the workpiece. At the same time the wedge member 108 enters the space 126 between the two backing members and exerts both a downward and an outward force against both backing members. The pressure of the cam member and the wedge member and the heat supplied by the heating pipes 64 of heating unit 62 combine to cure the glue, thereby providing a sound bond between the resinous shell and the backing members.

After the shell and the backing members have been firmly united the resulting article is transferred to apparatus C where the bending operation is performed which places the article in final form. The apparatus C comprises a base member 128 upon one end of which is fixed a block 130 and upon the other end of which is mounted a support 132 in the form of an I beam. A stop member 134 is fixed to the support 132 by bolts 136 and nuts 138. A heated pipe 140 is positioned adjacent one edge of the top 142 of the support 132.

The article is placed on the apparatus C with one end abutting the block 130 and with that portion 144 of the shell 51 which underlies the space 126 resting on the heated pipe 140. As the pipe heats the portion 144 it begins to melt and the weight of the article on either side of the softened portion 144 forces a bending action to take place at this area. The portion 146 of the article falls until it abuts against the stop 134. After a suitable heating time, the article is allowed to cool and after cooling the bend in the area 144 becomes permanent. The space 126 is thereafter filled in with backing material by bonding methods which will not be here described since they form no part of the present invention.

The process and apparatus have been illustrated as being used to form an article of a specific structural form. However, the form of the article is arbitrary and depends on its specific use. The same or substantially similar apparatus can be used in the same process to obtain any of the various configurations necessary for a particular use.

Although my invention has been described in considerable detail, such description is intended as being illustrative rather than limiting, since the invention may be variously embodied, and the scope of the invention is to be determined as claimed.

I claim as by invention:

The method of making a formed article comprising a resinous sheet backed by plywood which method comprises placing a resinous sheet in such position that its ends overlap oppositely disposed heating elements, allowing those portions of the sheet which overlie said heating elements to partially melt, pressing the overlapping portions of the sheet over said heating elements while the said overlying portions are in a partially melted stage, allowing said sheet to cool, applying an adhesive to said cooled sheet, bonding at least two spaced backing members to the adhesive coated resinous sheet while applying both a vertical and an angular pressure to said backing members and while simultaneously applying heat, allowing the resulting article to cool and then bending the said resulting article at the area underlying the space between the two backing members by applying this area over a heating element and allowing at least one portion of said article to fall by gravity after the said area is partially melted and then allowing the said article to cool.

References Cited in the file of this patent

UNITED STATES PATENTS

| | | |
|---|---|---|
| 1,406,160 | Klug | Feb. 7, 1922 |
| 1,626,190 | Elliot | Apr. 26, 1927 |
| 1,768,768 | Johnson | July 1, 1930 |
| 2,026,698 | Nelson | Jan. 7, 1936 |
| 2,183,984 | Campbell | Dec. 19, 1939 |
| 2,217,773 | Selva | Oct. 15, 1940 |
| 2,313,851 | Van Deventer | Mar. 16, 1943 |
| 2,409,460 | Waters | Oct. 15, 1946 |
| 2,648,370 | Beach | Aug. 11, 1953 |
| 2,649,124 | Merron | Aug. 18, 1953 |

FOREIGN PATENTS

| | | |
|---|---|---|
| 371,344 | Great Britain | Apr. 18, 1932 |
| 51,206 | France | Sept. 16, 1941 |
| | (Addition to No. 849,351) | |